United States Patent
Park et al.

(10) Patent No.: US 7,986,757 B2
(45) Date of Patent: Jul. 26, 2011

(54) APPARATUS AND METHOD OF ACQUIRING INITIAL SYNCHRONIZATION OF TERMINAL IN MOBILE COMMUNICATION SYSTEM

(75) Inventors: Hyeong-Sook Park, Daejeon (KR); Jun-Woo Kim, Daejeon (KR); Kyung-Yeol Sohn, Daejeon (KR); Youn-Ok Park, Daejeon (KR)

(73) Assignees: Samsung Electronics Co., LLP, Suwon-si (KR); Electronics and Telecommunications Research Institute, Daejeon (KR)

( * ) Notice: Subject to any disclaimer, the term of this patent is extended or adjusted under 35 U.S.C. 154(b) by 868 days.

(21) Appl. No.: 11/923,622

(22) Filed: Oct. 24, 2007

(65) Prior Publication Data

US 2008/0144756 A1    Jun. 19, 2008

(30) Foreign Application Priority Data

Dec. 8, 2006    (KR) .................. 10-2006-0124501

(51) Int. Cl.
*H04L 7/00*    (2006.01)

(52) U.S. Cl. ........ 375/356; 375/142; 375/150; 375/343; 375/354; 375/365

(58) Field of Classification Search .................. 375/142, 375/150, 343, 354, 356, 365
See application file for complete search history.

(56) References Cited

U.S. PATENT DOCUMENTS

| | | | |
|---|---|---|---|
| 2003/0067999 A1* | 4/2003 | Echavarri et al. ............. | 375/343 |
| 2006/0078040 A1 | 4/2006 | Sung et al. | |
| 2007/0004437 A1* | 1/2007 | Harada et al. ................. | 455/506 |
| 2008/0039107 A1* | 2/2008 | Ma et al. ....................... | 455/450 |
| 2008/0212563 A1* | 9/2008 | Birru ............................. | 370/350 |

FOREIGN PATENT DOCUMENTS

| | | |
|---|---|---|
| KR | 10-2005-0043290 A | 5/2005 |
| KR | 1020050066270 A | 6/2005 |
| KR | 10-2006-0032379 A | 4/2006 |
| WO | 2006/099527 A1 | 9/2006 |

OTHER PUBLICATIONS

Meng-Han Hsieh and Che-Ho Wei, "A Low-Complexity Frame Synchronization and Frequency Offset Compensation Scheme for OFDM Systems over Fading Channels", IEEE Transactions on Vehicular Technology, Sep. 1999, pp. 1596-1609, vol. 48, No. 5.
Jan-Jaap van de Beek, Magnus Sadell, Mikael Isaksson and Per Ola Borjesson, Low-complex Frame Synchronization in OFDM systems, Proc. Int. Conf. Universal Personal Communications, Tokyo, Japan, Nov. 1995, pp. 982-986.

* cited by examiner

*Primary Examiner* — Curtis B Odom
(74) *Attorney, Agent, or Firm* — Jefferson IP Law, LLP (57) ABSTRACT

The present invention relates to an apparatus and method of acquiring initial synchronization of a terminal in a mobile communication system. According to an exemplary embodiment of the present invention, one or more auto-correlation values of a preamble constituting a signal that is received from a base station are calculated. Averages of the calculated auto-correlation values according to samples are calculated, and then a peak value is detected among the calculated values. Then, a cell search is performed on the basis of the detected peak value, and a peak value from the result of the cell search is regularized. Then, the regularized peak value is compared with a predetermined reference value such that it is checked whether synchronization of a signal that has been searched is accurate or not. According to an exemplary embodiment of the present invention, a value obtained by regularizing a result of a cell search is compared with a reference value, and it is checked again whether an accurate start point of a frame is detected or not on the basis of a result of the comparison. Accordingly, false alarm rates can be reduced.

11 Claims, 5 Drawing Sheets

APPARATUS AND METHOD OF ACQUIRING INITIAL SYNCHRONIZATION OF TERMINAL IN MOBILE COMMUNICATION SYSTEM

CROSS-REFERENCE TO RELATED APPLICATION

This application claims priority to and the benefit of Korean Patent Application No. 10-2006-0124501 filed in the Korean Intellectual Property Office on Dec. 8, 2006, the entire content of which is incorporated herein by reference.

BACKGROUND OF THE INVENTION (a) Field of the Invention

The present invention relates to a mobile communication system, and more particularly, to an apparatus and method of acquiring initial synchronization of a terminal in a mobile communication system.

(b) Description of the Related Art

In general, a terminal in a mobile communication system needs to acquire synchronization first in order to perform communication between the terminal and a base station. When the terminal does not acquire the synchronization first, if a signal is transmitted or received, the received or transmitted signal serves only as an interference signal or noise between the terminal and the base station and does not allow any kind of information to be obtained. Therefore, it is a very important factor to acquire the initial synchronization between the terminal and the base station in all mobile communication systems.

Among the above mobile communication systems, a mobile communication system that uses code division multiple access (CDMA) has been widely used. However, the transmission of a larger amount of data in the CDMA mobile communication system is limited due to a bandwidth and a drain of resources.

A mobile communication system that uses orthogonal frequency division multiple access (hereinafter, for better comprehension and ease of description, referred to as "OFDMA") is provided as one of the methods to solve the above-described limit. The OFDMA is one of the multi-carrier modulation methods and shows excellent performance in a multi-path mobile reception environment. Therefore, research and development have been actively made in the field of broadcasting.

However, as described above, a terminal in the OFDMA mobile communication system that has the characteristics needs to acquire initial synchronization first in order to exchange data with a base station. A process of acquiring initial synchronization of the terminal will now be described.

First, in order to acquire initial synchronization, the terminal receives a signal from the base station. The signal includes a preamble and a data field. An example of this is shown in FIG. 1.

Figure 1:
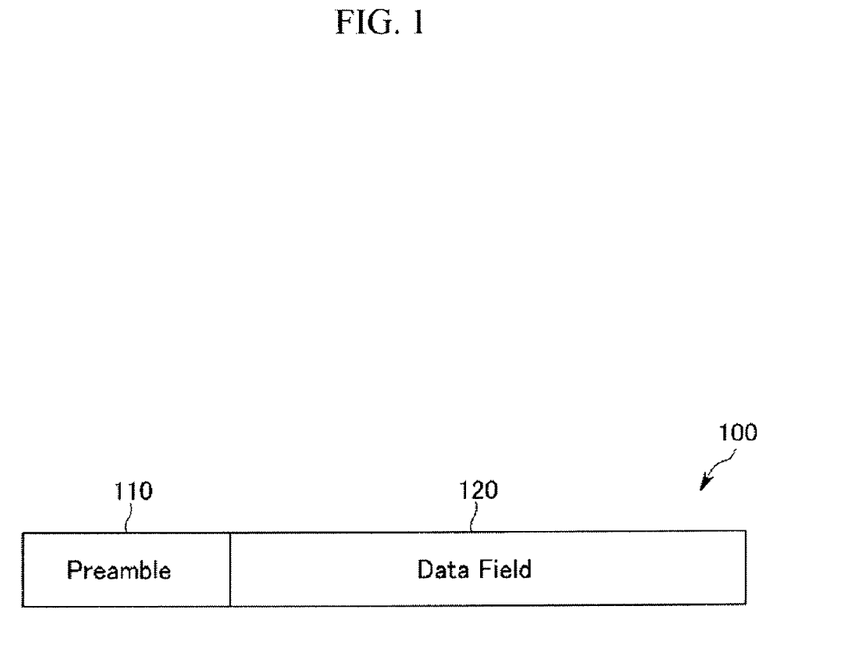
FIG. 1 is a diagram illustrating a data structure in an orthogonal frequency division multiple access system.

As shown in FIG. 1, a downlink frame 100 that is a signal received from the base station includes a preamble signal 110 and a data field 120 that has a pilot signal.

The terminal acquires initial synchronization using an auto-correlation characteristic of the preamble signal 110 of the received downlink frame. At this time, due to a periodical pilot pattern of the data field 120, the auto-correlation characteristic is greatly generated even at a position where the pilot signal is allocated.

That is, when the pilot pattern of the data field 120 is repeated by a number corresponding to a multiple of a number by which a pattern is repeated in a time domain of the preamble, the auto-correlation characteristic with respect to the pilot signal is greatly generated. As a result, when acquiring the initial synchronization, the terminal cannot search an accurate symbol start point due to an auto-correlation characteristic of another signal, not the preamble signal. This leads to an increase in false alarm rates.

Further, the wrong symbol start point that is searched by the terminal generates inter-symbol interference. Therefore, the signal received from the base station cannot be recovered properly.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an apparatus and method of acquiring initial synchronization of a terminal in a mobile communication system, having advantages of reducing false alarm rates by checking a start point of a frame on the basis of a result of a cell search.

An exemplary embodiment of the present invention provides an apparatus for acquiring initial synchronization of a terminal in a mobile communication system. The apparatus includes an auto-correlator that calculates one or more auto-correlation values of a preamble constituting a signal that is received, a peak value detecting unit that calculates averages of the calculated auto-correlation values according to samples and detects a peak value among the calculated averages according to the samples, a cell searching unit that performs a cell search on the basis of the detected peak value, a regularizing unit that searches a peak value from a result of the cell search and regularizes the peak value, and a reference value comparing unit that compares the regularized peak value with a predetermined reference value and checks synchronization of the received signal at least once.

Another embodiment of the present invention provides a method of acquiring initial synchronization of a terminal in a mobile communication system. The method includes calculating auto-correlation values of a preamble constituting a signal that is received, calculating averages of the calculated auto-correlation values according to samples and detecting a peak value among the calculated averages according to the samples, performing a cell search on the basis of the detected peak value, and comparing a peak value from a result of the cell search with a predetermined reference value and checking synchronization of the received signal at least once.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Hereinafter, in an exemplary embodiment of the present invention, an apparatus for acquiring initial synchronization of a terminal in an orthogonal frequency division multiple access system, which is one of the mobile communication systems, will be described. However, the orthogonal frequency division multiple access system is one example of the exemplary embodiment of the present invention. This embodiment of the present invention can be applied to another communication system.

The apparatus for acquiring initial synchronization of a terminal in the orthogonal frequency division multiple access system to which the exemplary embodiment of the present invention is applied will now be described.

Figure 2:
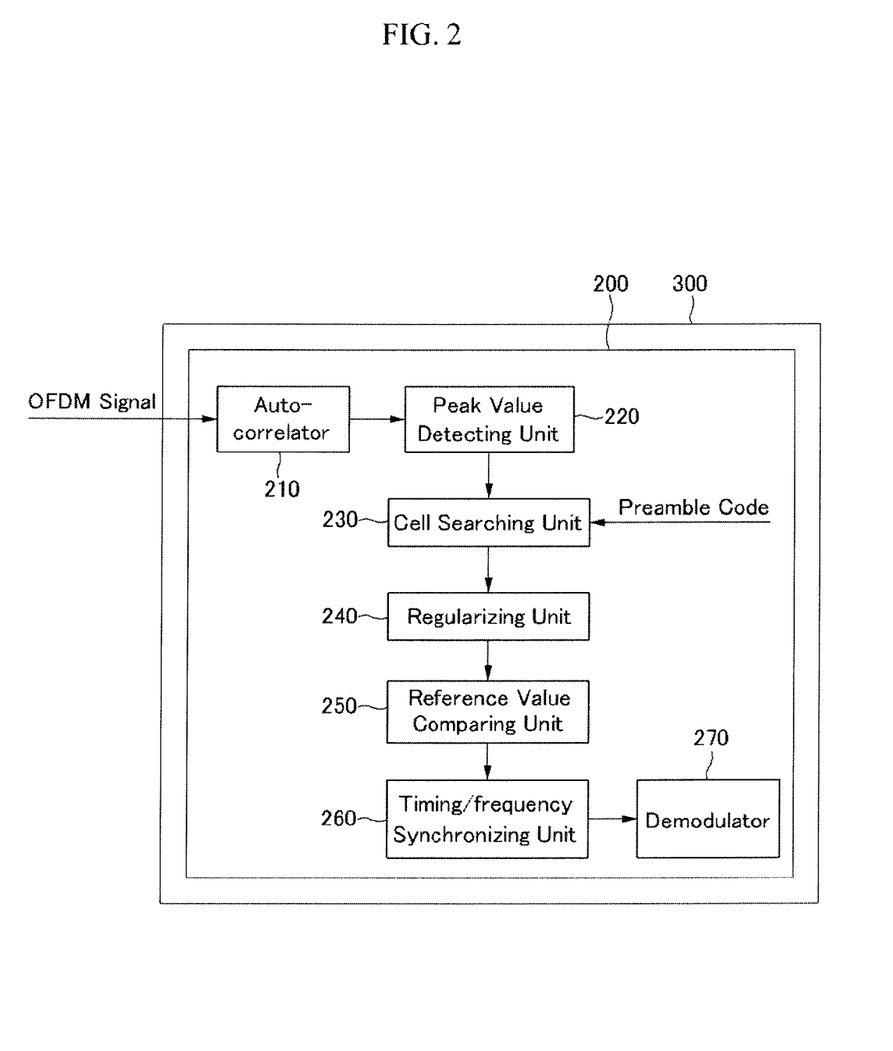
FIG. 2 is a diagram illustrating an apparatus for acquiring initial synchronization of a terminal in an orthogonal frequency division multiple access system according to an exemplary embodiment of the present invention.

FIG. 2 is a diagram illustrating an apparatus for acquiring initial synchronization of a terminal in an orthogonal frequency division multiple access system according to an exemplary embodiment of the present invention.

As shown in FIG. 2, an apparatus for acquiring initial synchronization 200 (hereinafter, referred to as an "initial synchronization acquiring apparatus") of a terminal 300 in the orthogonal frequency division multiple access system according to the exemplary embodiment of the present invention includes an auto-correlator 210, a peak value detecting unit 220, a cell searching unit 230, a regularizing unit 240, a reference value comparing unit 250, a timing/frequency synchronizing unit 260, and a demodulator 270.

The auto-correlator 210 of the initial synchronization acquiring apparatus 200 calculates auto-correlation values of a preamble that constitutes a downlink frame that is an orthogonal frequency division multiplexing (OFDM) signal received from a base station (not shown) by using a radio frequency (RF) receiver (not shown).

That is, the auto-correlator 210 converts the received OFDM signal into a digital signal, and then separates only the preamble from the converted digital signal. Then, the auto-correlator 210 calculates one or more auto-correlation values between the same samples that constitute the separated preamble. The calculation process and the structure of the OFDM signal will be described in detail when the operation of the apparatus for acquiring initial synchronization is described.

The peak value detecting unit 220 sums up the calculated auto-correlation values and calculates averages using the sums. Then, the peak value detecting unit 220 detects a peak value among the calculated averages according to the samples.

Here, the detected peak value may be regarded as a start point of the downlink frame that is received from the base station. However, unlike the related art, in the exemplary embodiment of the present invention, the start point is not immediately used to acquire initial synchronization, but another verification process that compares a result of a cell search with a predetermined reference value is performed to finally detect an accurate signal start point.

The cell searching unit 230 performs a cell search on the basis of the detected peak value.

Figure 3:
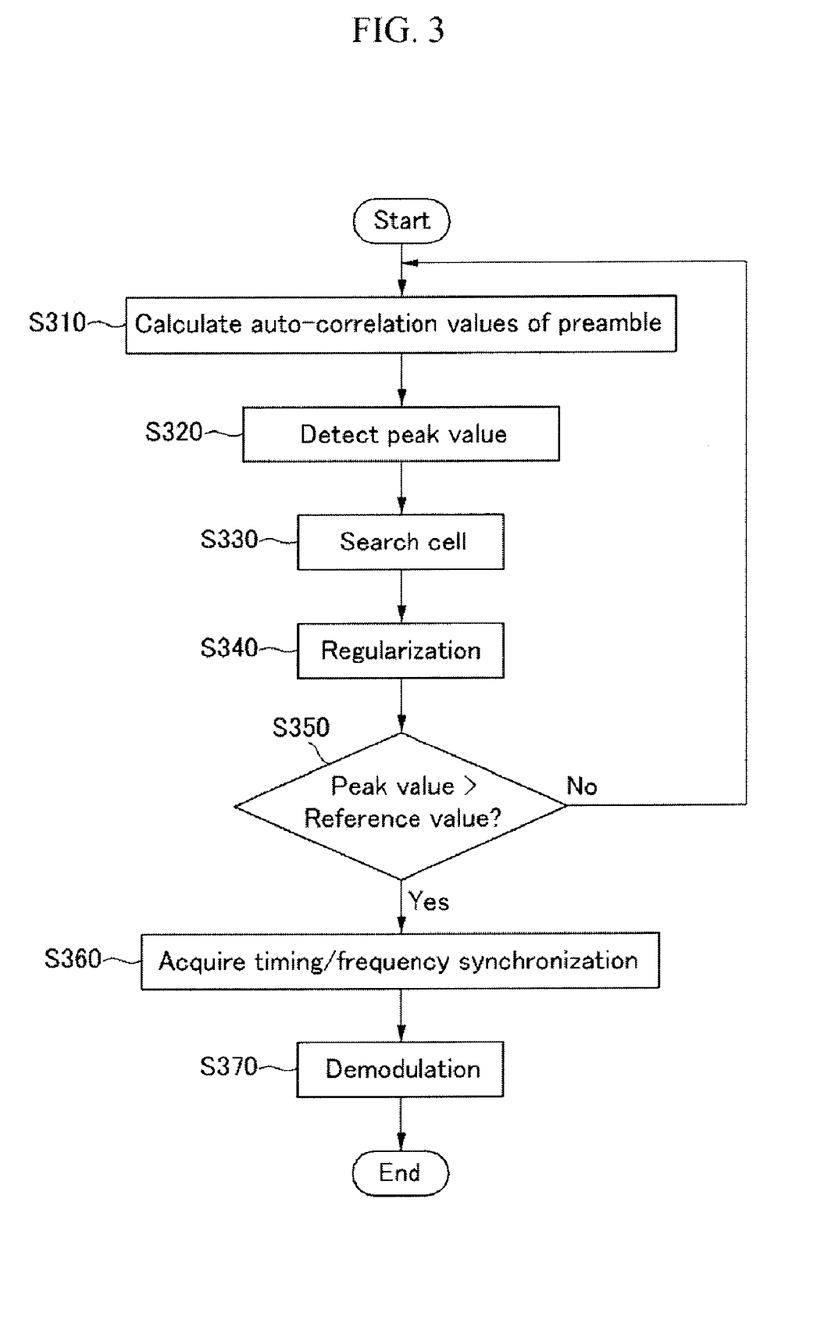
FIG. 3 is a flowchart sequentially illustrating the operation of the apparatus for acquiring initial acquisition of the terminal shown in FIG. 2.
Figure 4:
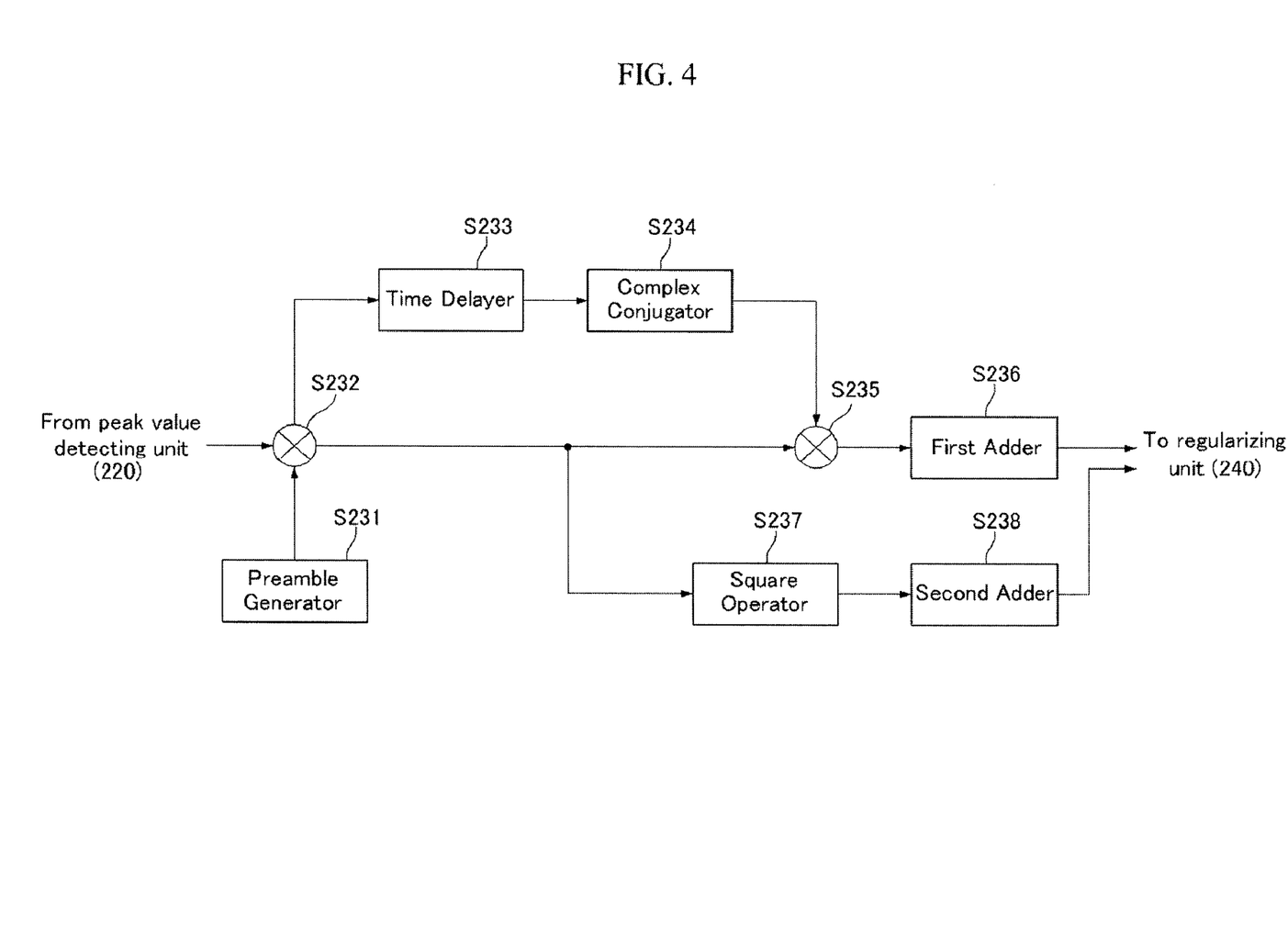
FIG. 4 is a block diagram illustrating a cell searching unit shown in FIG. 3.

FIG. 4 is a block diagram illustrating the cell searching unit shown in FIG. 3.

As shown in FIG. 4, the cell searching unit 230 includes a preamble generator 231, a first multiplier 232, a time delayer 233, a complex conjugator 234, a second multiplier 235, a first adder 236, a square operator 237, and a second adder 238.

The preamble generator 231 generates codes for all possible cases of a preamble signal.

The first multiplier 232 multiplies a preamble $\hat{S}(i)$ signal by a preamble code $s(i)$ and outputs values of the multiplication. The preamble signal $\hat{S}(i)$ is obtained on the basis of the position that is searched by the peak value detecting unit 220 using the auto-correlation characteristic of the auto-correlator 210. The preamble code $s(i)$ is generated by the preamble generator 231. This is represented by Equation 1.

$$D(i) = \hat{S}(i) \cdot s(i) \quad \text{(Equation 1)}$$

The time delayer 233 delays the values output from the first multiplier 232 by an amount of time corresponding to one frame and outputs the values. The complex conjugator 234 conjugates values output from the time delayer 233 and outputs complex-conjugates.

The second multiplier 235 multiples the values output from the first multiplier 232 and the values output from the complex conjugator 234 and outputs values of the multiplication. The first adder 236 adds up the values output from the second multiplier 235 during an OFDMA symbol period and outputs a value of the addition. This is represented by Equation 2.

$$R(i) = \left| \sum_{i=0}^{283} D(i-1) \cdot D(i) \right| \quad \text{(Equation 2)}$$

The square operator 237 performs a square operation on absolute values of the values output from the first multiplier 232 and outputs values obtained by performing the square operation. The second adder 238 adds up the values output from the square operator 237 during the OFDMA symbol period and outputs a value of the addition.

Meanwhile, the regularizing unit 240 regularizes a result of the cell search output from the cell searching unit 230 according to Equation 3 as shown below such that the regularized result can be compared with a predetermined reference value.

$$R(i) = \frac{\left| \sum_{i=0}^{283} D(i-1) \cdot D(i) \right|}{\sum_{i=0}^{283} |D(i)|^2} \quad \text{(Equation 3)}$$

The regularization of the result of the cell search allows the regularized result to be used when acquiring the initial synchronization. In the actual multi-path channel environment, it may be impossible to determine the size of the peak value that is calculated according to Equation 2. Therefore, the peak value is subjected to the regularization by Equation 3.

The reference value comparing unit 250 compares the regularized peak value with the predetermined reference value. As a result of the comparison, when the regularized peak value is larger than the predetermined reference value, the peak value of the calculated auto-correlation values becomes a start point of the OFDM signal. That is, the start point of the preamble is accurately found.

Meanwhile, if the regularized peak value is smaller than the reference value, the reference value comparing unit 250 causes calculation of one or more auto-correlation values between the same samples that constitute the preamble of the OFDM signal again.

That is, when the peak value is smaller than the reference value, it means that the accurate signal start point is not searched due to an auto-correlation characteristic of another signal, not the preamble, which constitutes the OFDM signal.

As such, the apparatus for acquiring initial synchronization of a terminal according to the exemplary embodiment of the present invention uses the existing function units. Further, the apparatus regularizes the result of the cell search, compares the regularized result with the predetermined reference value, and checks whether the signal start point is accurately detected or not on the basis of a result of the comparison. This leads to a reduction in false alarm rates.

The timing/frequency synchronizing unit 260 obtains a phase value using the auto-correlation values between the same samples that constitute the separated preamble, and then calculates a frequency error between the same samples by using a distance between the phase value and the samples.

The timing/frequency synchronizing unit 260 estimates the frequency error by using different weight values between the samples to thereby acquire synchronization. In such a manner, a process of acquiring the synchronization is completed to demodulate the OFDM signal.

The demodulator 260 demodulates the OFDM signal that is received from the base station in a predetermined manner according to the synchronization that is acquired by the above-described process.

The operation of the apparatus for acquiring initial synchronization of a terminal that has the above-described structure will now be described.

FIG. 3 is a flowchart sequentially illustrating the operation of an apparatus for acquiring initial synchronization of a terminal according to an exemplary embodiment of the present invention.

First, the auto-correlator 210 of the terminal 200 calculates auto-correlation values of a preamble constituting an OFDM signal that is received from the base station by using the radio frequency (RF) receiver (Step S310).

For reference, the OFDM signal received from the base station includes the preamble that is used to acquire initial synchronization and a data field that contains actual data.

The preamble has a structure in which sixteen values are repeated ten times. The data field includes tens of OFDM symbols, each of which includes M guard intervals and N data. At this time, N is larger than M.

However, the present invention is not limited to the structure. The number and size may be different according to cases.

Specifically, the auto-correlator 210 converts the OFDM signal having the above-described structure into a digital signal and separates only the preamble from the converted digital signal. Then, the auto-correlator 210 calculates one or more auto-correlation values between the same samples that constitute the separated preamble.

Then, the peak value detecting unit 220 sums up the calculated auto-correlation values and calculates averages using the sums, and detects a peak value among the calculated averages according to the samples (Step S320).

The detected peak value may be regarded as a start point of a downlink frame. Unlike the related art, in the exemplary embodiment of the present invention, the detected peak value is not immediately used. However, another verification process that compares a value obtained by regularizing a result of a cell search with a predetermined reference value is performed to finally detect a signal start point.

Specifically, the cell searching unit 230 starts a cell search on the basis of the detected peak value. When a code of the preamble that corresponds to the peak value detected among the auto-correlation values is denoted by $\hat{S}(i)$, and a code of a preamble that is generated by a preamble generator (not shown) is denoted by s(i), the two codes are multiplied by each other according to Equation 1 as shown above. Values of the multiplication are calculated by Equation 2 as shown above. An ID of a cell that corresponds to a peak value among the calculated values is searched (Step S330).

Then, the regularizing unit 240 regularizes the peak value, which is calculated by Equation 1, according to Equation 3 as described above (Step S340).

Figure 5A:
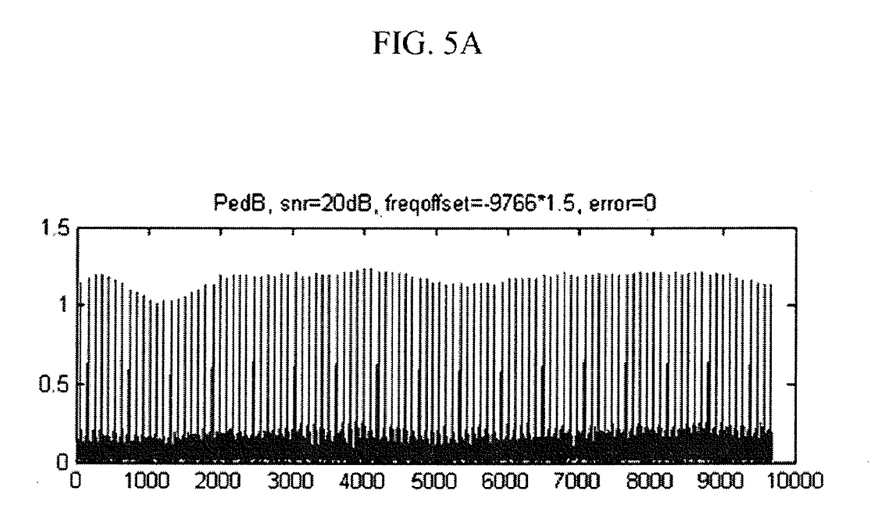
FIGS. 5A and 5B are graphs illustrating a result of regularizing a cell search result according to an exemplary embodiment of the present invention.
Figure 5B:
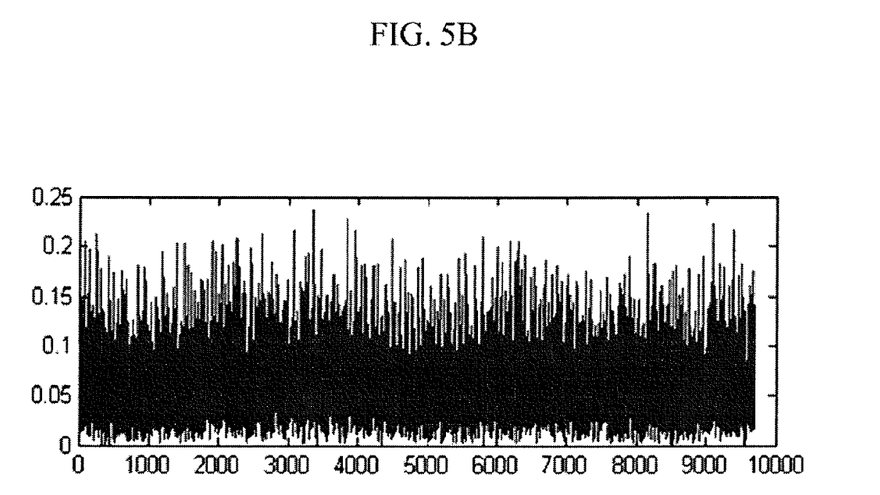

In FIGS. 5A and 5B, examples of a result of the regularization according to the above-described Equation 3 are shown.

When the signal start point that is obtained by the peak value detecting unit 220 is an accurate signal start point, as shown in FIG. 5A, only the corresponding cell ID in the entire downlink frame has the peak value.

However, when the signal start point that is obtained by the peak value detecting unit 220 is a wrong signal start point, as shown in FIG. 5B, the cell ID cannot be determined.

Then, the reference value comparing unit 250 compares the regularized peak value with the predetermined reference value (Step S350).

As a result of the comparison, when the regularized peak value is larger than the predetermined reference value, the peak value of the above calculated auto-correlation values becomes a start point of the OFDM signal. That is, the reference value comparing unit 250 checks the synchronization of the OFDM signal again by performing a process of comparing the regularized result of the cell search with the predetermined reference value, such that a signal start point is accurately searched.

Meanwhile, if the regularized peak value is smaller than the reference value, the reference value comparing unit 250 causes calculation of one or more auto-correlation values between the same samples that constitute the preamble of the OFDM signal (Step S310).

That is, when the peak value is smaller than the reference value, it means that the accurate signal start point is not searched due to an auto-correlation characteristic of another signal, not the preamble, which constitutes the OFDM signal. Therefore, the operation process is repeated until the accurate start point is searched.

As such, the apparatus for acquiring initial synchronization according to the exemplary embodiment of the present invention uses the existing function units. Further, the apparatus compares the regularized result of the cell search with the predetermined reference value and checks whether the accurate signal start point is detected or not on the basis of a result of the comparison. That is, the result of the cell search is reflected when acquiring the initial synchronization, which leads to a reduction in false alarm rates.

Then, the timing/frequency synchronizing unit 260 obtains a phase value using the auto-correlation values between the same samples that constitute the separated preamble, and then calculates a frequency error between the same samples using a distance between the phase value and the samples.

Then, the timing/frequency synchronizing unit 260 estimates the frequency error using different weight values between the samples, and acquires timing/frequency synchronization (Step S360). In such a manner, the process of acquiring the synchronization is completed to demodulate the OFDM signal.

Then, the demodulator 260 demodulates the OFDM signal received from the base station in a predetermined manner according to the synchronization that is acquired by the above-described process (Step S370).

It should be understood that the above drawings and detailed description of the embodiments are not limitative, but illustrative in all aspects. It can be understood by those skilled in the art that the invention is intended to cover various modifications and other equivalent arrangements. Therefore, the scope of the present invention is defined by the appended claims rather than by the description preceding them.

As described above, according to the exemplary embodiment of the present invention, while the existing function units are used, the regularized result of the cell search is compared with the predetermined reference value, and it is checked whether the accurate start point of the frame is detected or not on the basis of a result of the comparison. Accordingly, false alarm rates can be remarkably reduced.

What is claimed is:

1. An apparatus for acquiring initial synchronization of a terminal in a mobile communication system, the apparatus comprising:
    an auto-correlator that calculates one or more auto-correlation values of a preamble constituting a signal that is received;
    a peak value detecting unit that calculates averages of the calculated auto-correlation values according to samples and detects a peak value among the calculated averages according to the samples;
    a cell searching unit that performs a cell search on the basis of the detected peak value;
    a regularizing unit that searches a peak value from a result of the cell search and regularizes the peak value; and
    a reference value comparing unit that compares the regularized peak value with a predetermined reference value and checks synchronization of the received signal at least once,
    wherein the cell searching unit comprises a preamble generator that generates codes for all possible cases of a preamble signal, and performs the cell search using the detected peak value and a preamble code that is generated by the preamble generator.

2. The apparatus of claim 1, wherein the reference value comparing unit uses the peak value of the calculated auto-correlation values as a start point of the preamble when the regularized peak value is larger than the reference value.

3. The apparatus of claim 1, wherein the cell searching unit further comprises:
    a first multiplier that multiplies a preamble signal obtained on the basis of a position, which is searched by the peak value detecting unit using an auto-correlation characteristic of the auto-correlator, and a preamble code that is generated by the preamble generator;
    a time delayer that delays values output from the first multiplier;
    a complex conjugator that conjugates values output from the time delayer and outputs complex-conjugates;
    a second multiplier that multiplies the values output from the first multiplier and values output from the complex conjugator and outputs values of the multiplication;
    a first adder that adds up the values output from the second multiplier and outputs a value of the addition;
    a square operator that performs a square operation on absolute values of the values output from the first multiplier and outputs values of the square operation; and
    a second adder that adds up the values output from the square operator and outputs a value of the addition.

4. The apparatus of claim 3, wherein the regularizing unit performs regularization by dividing the value output from the first adder by the value output from the second adder.

5. The apparatus of claim 3, wherein the value output from the first adder is calculated by using a preamble code $\hat{s}(i)$ that corresponds to a peak value detected by the peak value detecting unit and an original preamble code $s(i)$ by the following equation:

$$R(i) = \left| \sum_{i=0}^{283} D(i-1) \cdot D(i) \right|,$$

where $D(i) = \hat{S}(i) s(i)$.

6. The apparatus of claim 4, wherein the regularizing unit regularizes the detected peak value by using a preamble code $\hat{S}(i)$ that corresponds to the peak value detected by the peak value detecting unit and an original preamble code $s(i)$ by the following equation:

$$R(i) = \frac{\left| \sum_{i=0}^{283} D(i-1) \cdot D(i) \right|}{\sum_{i=0}^{283} |D(i)|^2}.$$

wherein $D(i) = \hat{S}(i) \cdot S(i)$.

7. A method of acquiring initial synchronization of a terminal in a mobile communication system, the method comprising:
    calculating auto-correlation values of a preamble constituting a signal that is received;
    calculating averages of the calculated auto-correlation values according to samples and detecting a peak value among the calculated averages according to the samples;
    performing a cell search on the basis of the detected peak value;
    regularizing the peak value that is detected from the result of the cell search; and
    comparing a peak value from a result of the cell search with a predetermined reference value and checking synchronization of the received signal at least once,
    wherein the mobile communication system comprises a preamble generator that generates codes for all possible cases of a preamble signal, and
    wherein the performing of the cell search on the basis of the detected peak value and a preamble code is generated by the preamble generator.

8. The method of claim 7, wherein the regularized peak value is compared with the reference value in the comparing of the peak value from the result of the cell search with the predetermined reference value.

9. The method of claim 8, wherein the comparing of the peak value from the result of the cell search with the predetermined reference value and checking of the synchronization of the received signal at least once comprises:
    using the peak value of the calculated auto-correlation values as a start point of the preamble when the regularized peak value is larger than the reference value; and repeating the calculating of the auto-correlation values of the preamble constituting the signal that is received, the calculating of the averages of the calculated auto-correlation values according to samples and detecting of the peak value among the calculated averages according to the samples, the performing of the cell search on the basis of the detected peak value, and the comparing of the peak value from the result of the cell search with the predetermined reference value and checking of the synchronization of the received signal at least once, when the regularized peak value is smaller than the reference value.

10. The method of claim 7, wherein the calculating of the auto-correlation values of the preamble constituting the signal that is received comprises:

converting the received signal into a digital signal; and separating the preamble from the converted digital signal; and calculating at least one of the auto-correlation values between the same samples that constitute the separated preamble.

11. The method of claim 7, wherein the performing of the cell search on the basis of the detected peak value comprises:

multiplying the detected peak value and the preamble code and outputting a multiplied value;

delaying the multiplied value and a delayed value;

conjugating the delayed value and outputting complex-conjugates;

multiplying the multiplied value and the complex-conjugates and outputting values of the multiplication;

adding up the values of the multiplication and outputting a value of the addition;

performing a square operation on absolute values of the multiplied value and outputting values of the square operation; and adding up the values of the square operation and outputting an added value.

* * * * *